United States Patent
Caprioli et al.

(10) Patent No.: US 7,461,208 B1
(45) Date of Patent: Dec. 2, 2008

(54) CIRCUITRY AND METHOD FOR ACCESSING AN ASSOCIATIVE CACHE WITH PARALLEL DETERMINATION OF DATA AND DATA AVAILABILITY

(75) Inventors: Paul Caprioli, Mountain View, CA (US); Sherman H. Yip, San Francisco, CA (US); Shailender Chaudhry, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 313 days.

(21) Appl. No.: 11/155,147

(22) Filed: Jun. 16, 2005

(51) Int. Cl.
*G06F 13/16* (2006.01)
(52) U.S. Cl. .................................................. 711/128
(58) Field of Classification Search ................. 711/128
See application file for complete search history.

(56) References Cited

U.S. PATENT DOCUMENTS

| | | | |
|---|---|---|---|
| 6,356,990 B1 * | 3/2002 | Aoki et al. .................. 711/205 |
| 6,678,792 B2 * | 1/2004 | van de Waerdt ............. 711/128 |
| 6,868,471 B1 * | 3/2005 | Kota ............................. 711/2 |

OTHER PUBLICATIONS

Handy, Jim., "The Cache Memory Book," 1998, Academic Press Limited, 2nd Edition, ISBN: 0-12-322980-4, pp. 16 & 62.*
Hennessy, John L., "Computer Organization and Design", 1998, Morgna Kaufmann Publishers, Inc., Second Edition, pp. 231 & B-46, ISBN: 1-55860-428-6.*

* cited by examiner

*Primary Examiner*—Kevin Ellis
*Assistant Examiner*—Shawn Eland
(74) *Attorney, Agent, or Firm*—Martine Penilla & Gencarella, LLP (57) ABSTRACT

A circuit for accessing an associative cache is provided. The circuit includes data selection circuitry and an outcome parallel processing circuit both in communication with the associative cache. The outcome parallel processing circuit is configured to determine whether an accessing of data from the associative cache is one of a cache hit, a cache miss, or a cache mispredict. The circuit further includes a memory in communication with the data selection circuitry and the outcome parallel processing circuit. The memory is configured to store a bank select table, whereby the bank select table is configured to include entries that define a selection of one of a plurality of banks of the associative cache from which to output data. Methods for accessing the associative cache are also described.

20 Claims, 8 Drawing Sheets

CIRCUITRY AND METHOD FOR ACCESSING AN ASSOCIATIVE CACHE WITH PARALLEL DETERMINATION OF DATA AND DATA AVAILABILITY

BACKGROUND

Figures 1A, 1B:
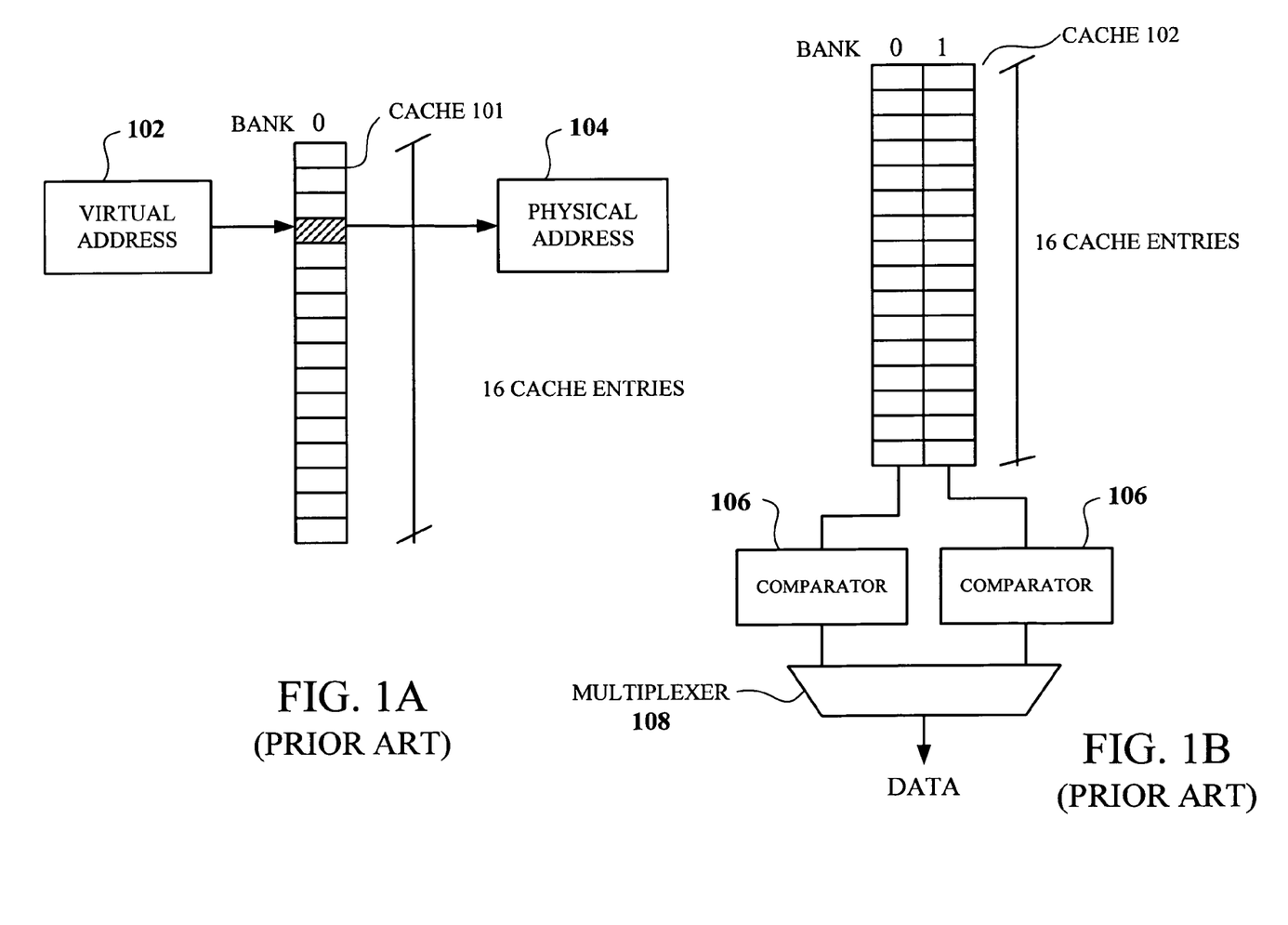
FIG. 1A is a simplified block diagram of a conventional one-bank cache.
FIG. 1B is a simplified block diagram of a conventional two-bank associative cache.

A cache is a collection of data duplicating original values stored elsewhere, where the original data takes a longer access time relative to accessing the cache. FIG. 1A is a simplified block diagram of a conventional, direct-mapped cache. As shown in FIG. 1A, cache 101 has only one bank with sixteen entries (e.g., virtual to physical address translations). Cache entries are indexed like elements in an array, and there is a cache index associated with each entry. When a processor or program requests that an entry be loaded with contents from a main memory, the main memory location is specified by virtual address 102. One skilled in the art will appreciate that the low-order four bits of virtual address 102 are typically used to index into a bank with sixteen entries. The low-order four bits are mapped to physical address 104 of the main memory. Since cache 101 has only one bank, virtual address 102 is directly mapped to physical address 104 of the main memory. Accordingly, direct mapping allows data to be quickly translated and accessed from cache 101.

Another type of cache is a multiple-bank associative cache. The difference between direct-mapped cache and multiple-bank associative cache is that instead of mapping to a single bank, a virtual address associated with the associative cache maps to several banks. For example, FIG. 1B shows a conventional two-bank associative cache 102, whereby each virtual address maps to two cache banks. Comparators 106 check the address of both entries. If one of those entries holds the requested data, then the data from that one entry is outputted through multiplexor 108.

A multiple-bank associative cache performs better (e.g., better cache hit ratios) than a direct-mapped cache. On the other hand, a multiple-bank associative cache takes longer to access data than a direct mapped cache because the associative cache has the added burden of comparing the addresses to determine whether there is a match. As a result, there is a need to provide methods and circuitries for accessing data from a cache that has the fast timing characteristic of a direct-mapped cache while retaining the performance advantages of an associative cache.

SUMMARY

Broadly speaking, the present invention fills these needs by providing circuitries and methods for accessing an associative cache. It should be appreciated that the present invention can be implemented in numerous ways, including as a method, a system, or a device. Several inventive embodiments of the present invention are described below.

In accordance with a first aspect of the present invention, a method for accessing an associative cache is provided. In this method, a request is received for data in the associative cache whereby the request includes an address of the data. The data is accessed out at the address of the associative cache. At the same time, an entry is read from a bank select table based on the address of the data. The entry defines a selection of one of a plurality of banks of the associative cache to output the data. A determination is made whether the accessing out the data is one of a cache hit, a cache miss, or a cache mispredict. It should be appreciated that the method operations of accessing out the data, reading an entry from a bank select table, and making the determination are processed in parallel.

In accordance with a second aspect of the present invention, a circuit for accessing an associative cache is provided. The circuit includes data selection circuitry and an outcome parallel processing circuit both in communication with the associative cache. The outcome parallel processing circuit is configured to determine whether an accessing of data from the associative cache is one of a cache hit, a cache miss, or a cache mispredict. The circuit further includes a memory in communication with the data selection circuitry and the outcome parallel processing circuit. The memory is configured to store a bank select table, whereby the bank select table is configured to include entries that define a selection of one of a plurality of banks of the associative cache from which to output data.

In accordance with a third aspect of the present invention, a method for accessing an associative cache is provided. In this method, a least recently used replacement table is provided. The least recently used replacement table is configured to include entries that define one of a plurality of banks of the associative cache to be replaced on a cache miss. On a cache access, a slice of the least recently used replacement table is replaced with entries that define a selection of one of the plurality of banks that is less recently used.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention is described for methods and circuitries for accessing an associative cache. It will be obvious, however, to one skilled in the art, that the present invention may be practiced without some or all of these specific details. In other instances, well known process operations have not been described in detail in order not to unnecessarily obscure the present invention.

The embodiments described herein provide methods and circuitries for accessing a multiple-bank associative cache. In one embodiment, at the same time a data is being accessed in the associative cache, an entry from a bank select table is read. As will be explained in more detail below, the read entry defines a selection of a bank of the associative cache to output the data. An outcome parallel processing circuit in communication with the associative cache determines in parallel with the accessing of data whether the selection read from the bank select table results in a cache hit, a cache miss, or a cache mispredict.

Figure 2:
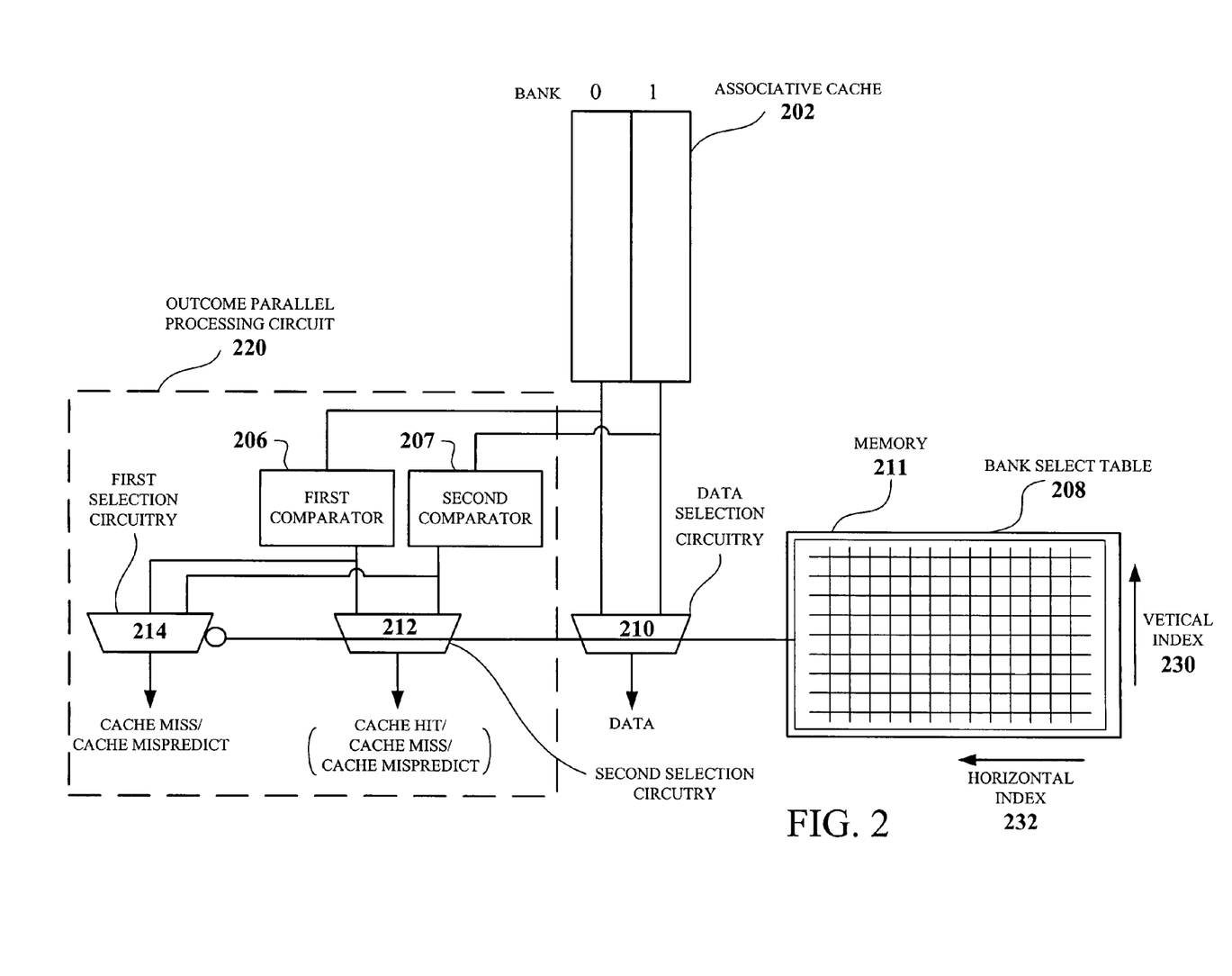
FIG. 2 is a simplified schematic diagram of an exemplary circuit for accessing a two-bank associative cache, in accordance with one embodiment of the present invention.

FIG. 2 is a simplified schematic diagram of an exemplary circuit for accessing a two-bank associative cache, in accordance with one embodiment of the present invention. As shown in FIG. 2, circuitry includes data selection circuitry 210 (e.g., a multiplexor) in communication with associative cache 202 that includes two banks, identified as Bank 0 and Bank 1. It should be appreciated that associative cache 202 can be any suitable cache. Exemplary associative cache 202 includes a data Translation Lookaside Buffer (dTLB), an Instruction Translation Lookaside Buffer, a Jump Target Buffer, etc. Circuit for accessing associative cache 202 also includes outcome parallel processing circuit 220 in communication with associative cache 202, and additionally includes memory 211 configured to store bank select table 208 that is in communication with the outcome parallel processing circuit.

Outcome parallel processing circuit 220 is configured to determine whether an accessing of data from associative cache 202 is a cache hit, a cache miss, or a cache mispredict. Outcome parallel processing circuit 220 includes comparators in communication with associative cache 202 and also includes selection circuitries (e.g., multiplexors). As shown in FIG. 2, for associative cache 202 with two banks, an embodiment of outcome parallel processing circuit 220 includes first comparator 206 and second comparator 207, one for each bank of the associative cache, and first selection circuitry 214 and second selection circuitry 212 in parallel communication with the first and second comparators. As will be explained in more detail below, second selection circuitry 212 is configured to identify whether a data access from associative cache 202 is a cache hit. If the data access is not a cache hit, first selection circuitry 214 is configured to further identify whether the data access is a cache miss or a cache mispredict. It should be appreciated that a cache miss occurs when the accessed data is not found in associative cache 202, and a cache mispredict occurs when the accessed data is found in another, non-accessed bank of the associative cache.

Data selection circuitry 210 outputs the data being accessed from either Bank 0 or Bank 1 of associative cache 202. Specifically, data selection circuitry 210 selects one of the two banks for output based on a selection input from bank select table 208. First and second selection circuitries 214, 212, as well as data selection circuitry 210, has selection inputs that are read from bank select table 208. Here, bank select table 208 includes entries that define a selection of a particular bank, such as Bank 0 or Bank 1, to output data. For example, since associative cache 202 as shown in FIG. 2 has two banks, each entry of bank select table 208 is one bit storing either a 0 value or a 1 value, which selects Bank 0 or Bank 1, respectively. If associative cache 202 has four banks (not shown), then each entry of bank select table 208 is two bits that may store either a 0 value, a 1 value, a 2 value, or a 3 value, which selects Bank 0, Bank 1, Bank 2, or Bank 3, respectively. The size of bank select table 208 is based on the size of associative cache 202. For example, if each of the two banks of associative cache 202 has sixteen entries, then the size of bank select table 208 is 16 entries×16 entries, which equals to 256 entries. The index of bank select table 208 is based on the address of a main memory (e.g., virtual address, physical address, etc.), which is in communication with associative cache 202, being accessed. As shown in FIG. 2, bank select table 208 of two-bank associative cache 202 is defined by two indexes (horizontal index 232 and vertical index 230). In one embodiment, each index maps to a particular bank. The indexes may be based directly from addresses of associative cache 202 and/or based on hashes calculated from the addresses of the associative cache. For example, vertical index 230 indexes Bank 0 by using the lower four bits of a virtual address. Bank 1 is indexed along horizontal index 232 using a hash of the virtual address bits (e.g., every fourth bit can be XORed (exclusive disjunction) together). In this way, a super index can be created by concatenating the two indexes together.

First and second selection circuitries 214, 212 of outcome parallel processing circuit 220 are also driven by the selection input from bank select table 208. First and second selection circuitries 214, 212 are configured to determine whether the data access is a cache hit, a cache miss, or a cache mispredict simultaneously (i.e., in parallel) with the accessing out of the data from data selection circuitry 210. As will be explained in more detail below, first and second comparators 206, 207 compare the address of the accessed data with addresses of entries in each of the banks to determine whether the data is stored in Bank 0, Bank 1, or not stored in associative cache 202. First and second selection circuitries 214, 212 then take the comparison results from first and second comparators 206, 207 and selection input from bank select table 208 to determine whether the outputted data from data selection circuitry 210 is a cache hit, a cache miss, or a cache mispredict.

Figure 3:
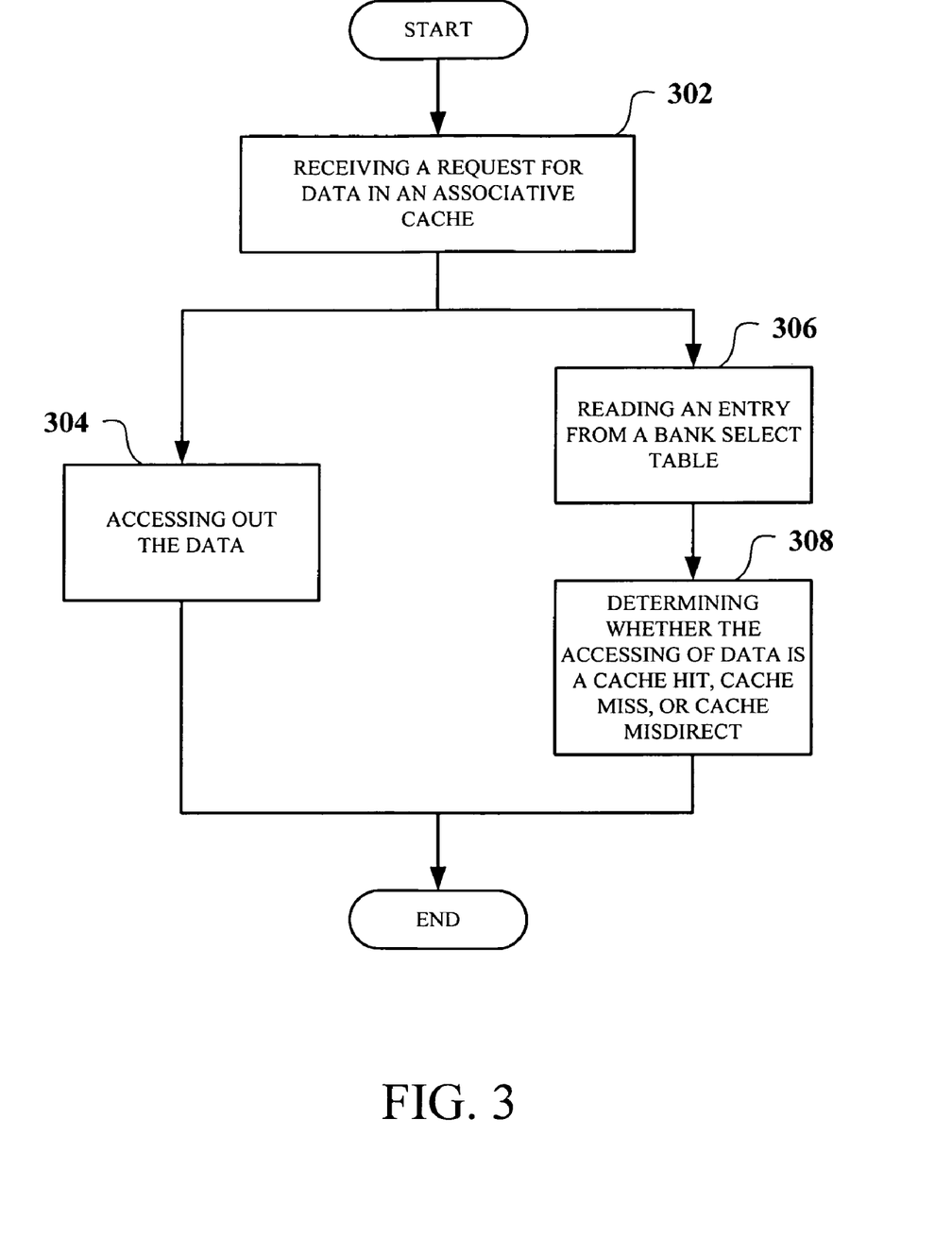
FIG. 3 is a high level flowchart illustrating the method operations for accessing an associative cache, in accordance with one embodiment of the present invention.

FIG. 3 is a high level flowchart illustrating the method operations for accessing an associative cache, in accordance with one embodiment of the present invention. Starting in operation 302, a request for data in the associative cache is received, whereby the request includes an address of the data. Thereafter, the data is accessed out of the associative cache in operation 304. At the same time, in operation 306, an entry is read from a bank select table based on the address of the data. The address of the data serves as an index into the bank select table and, as discussed above, each entry of the bank select table defines a selection of a bank of the associative cache to output the data. Thereafter, in operation 308, a determination is made whether the data access is a cache hit, a cache miss, or a cache mispredict. As shown in FIG. 3, it should be appreciated that the method operations 304, 306, and 308 are processed in parallel such that a determination is made whether the data is a cache hit, a cache miss, or a cache mispredict at the same time the data is accessed out from the associative cache.

As will be explained in more detail below, if the accessing out of the data is a cache mispredict, the corresponding entry of the bank select table used to select a bank is replaced with another entry that defines a selection of the bank that actually contains the data. If the accessing out of the data is a cache miss, the corresponding entry of the bank select table is replaced with a randomly generated entry, in accordance with one embodiment of the present invention. The cache itself is then filled into this bank. In other words, the corresponding entry is replaced with a selection of a bank that is randomly generated, and this selection value selects which bank of cache is filled. In another embodiment, if the accessing out of the data is a cache miss, the corresponding entry of the bank select table is replaced with another entry read from a least recently used (LRU) replacement table.

A. Cache Hit

Figure 4:
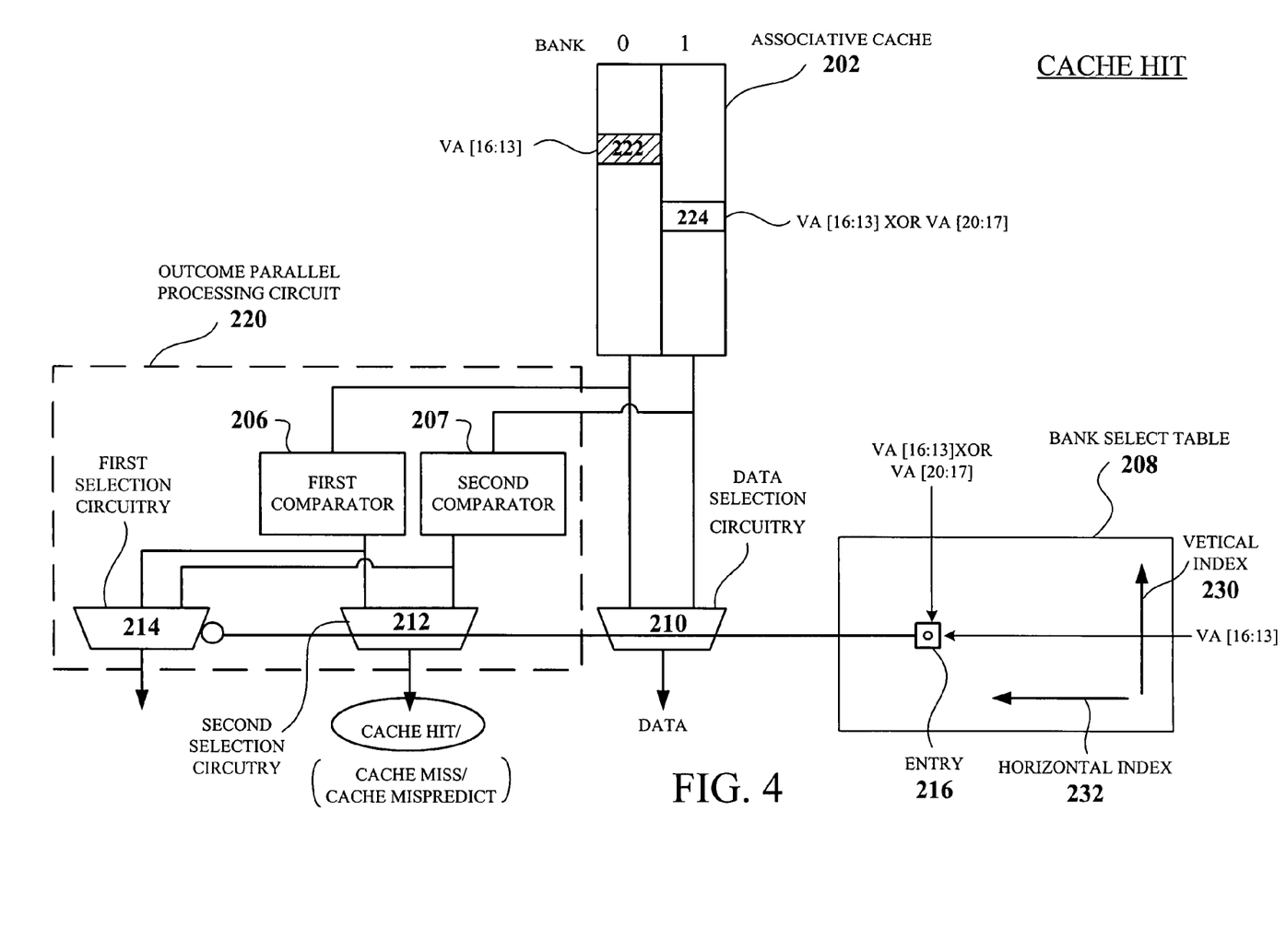
FIG. 4 illustrates the outcome parallel processing circuit of FIG. 2 making a determination that a data access is a cache hit, in accordance with one embodiment of the present invention.

FIG. 4 illustrates the outcome parallel processing circuit of FIG. 2 making a determination that a data access is a cache hit, in accordance with one embodiment of the present invention. When a cache client (e.g., a central processing unit) wishes to access a data from a main memory, the cache client first checks two-bank associative cache 202 for the data. If an entry of associative cache 202 can be found with matching addresses, the data in the entry of the associative cache is accessed instead of the data stored in the main memory. In this example, a virtual address (VA) is used for the cache lookup. It should be appreciated that each virtual address that points to a memory cell in a main memory is mapped to a physical address of the main memory. As shown in FIG. 4, the virtual address points to two entries 222, 224 of associative cache 202. The desired data is actually stored in entry 222 of Bank 0 (as identified by a hatched pattern). Bank select table 208 includes horizontal index 232 and vertical index 230. Horizontal index 232 and vertical index 230 can be based on the virtual address. In this example, vertical index 230 indexes to Bank 0 by using the lower four bits VA[16:13] of the virtual address. Bank 1 is indexed along horizontal index 232 using a hash of every four bits XORed together (i.e., VA[16:13] XOR VA[20:17]).

When associative cache 202 is accessed, data from entries 222, 224 of the associative cache are outputted to data selection circuitry 210. Data selection circuitry 210 selects either data from entry 222 of associative cache 202 or data from entry 224 of the associative cache for output depending on a selection input read from bank select table 208. As shown in FIG. 4, the virtual addresses of entries 222, 224 of associative cache 202 index into entry 216 of bank select table 208. Here, a value of 0, which refers to Bank 0, is stored in entry 216 of bank select table 208. Accordingly, with selection input of 0 read from entry 216 of bank select table 208, data selection circuitry 210 selects data from of Bank 0 for output (i.e., entry 222 of associative cache 202 for output).

At the same time data selection circuitry 210 outputs the data, outcome parallel processing circuit 220 makes a determination on whether the data access is a cache hit, a cache miss, or a cache mispredict. In particular, first comparator 206, which is in communication with Bank 0, compares the virtual address of the accessed data with the addresses from Bank 0 to determine whether the data is stored in Bank 0. Similarly, second comparator 207, which is in communication with Bank 1, compares the virtual address of the accessed data with the addresses from Bank 1 to determine whether the data is stored in Bank 1. The outputs of first and second comparators 206, 207 (e.g., outputs a 1 value if inputs are equal and a 0 value otherwise) are inputted into first and second selection circuitries 214, 212. As discussed above, second selection circuitry 212 is configured to determine whether the data access is a cache hit. Specifically, second selection circuitry 212 selects either the comparator result from first comparator 206 or the comparator result from second comparator 207 for output depending on the selection input read from bank select table 208. In this example, with selection input of 0 read from entry 216 of bank select table 208, second selection circuitry 212 selects comparison result from first comparator 206 for output, which identifies the data access from Bank 0 as a cache hit (as circled in FIG. 4). The output from first selection circuitry 214 is ignored because outcome parallel processing circuit 220 has already determined that the data access is a cache hit.

B. Cache Mispredict

Figure 5:
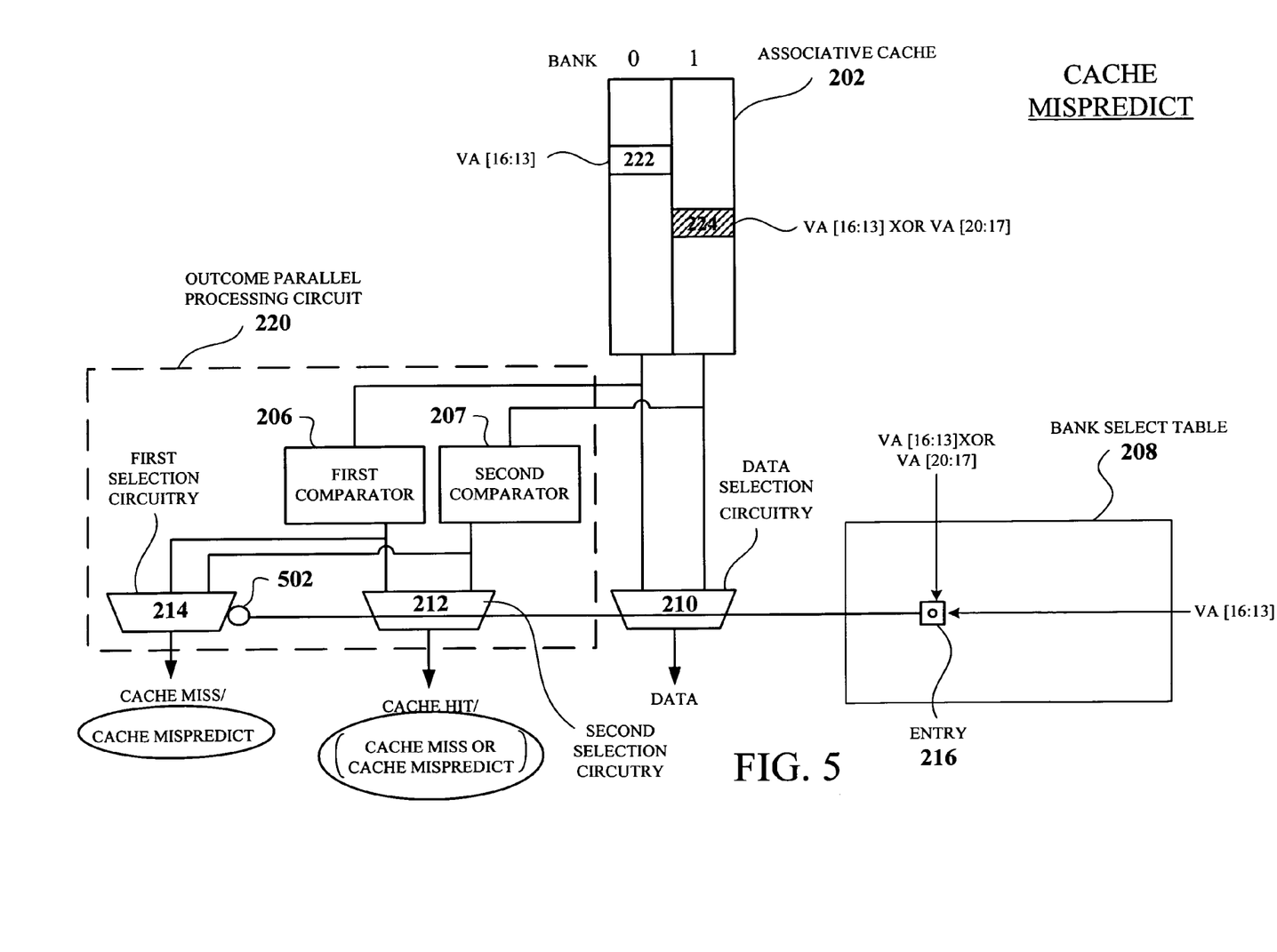
FIG. 5 illustrates the outcome parallel processing circuit of FIG. 2 making a determination that a data access is a cache mispredict, in accordance with one embodiment of the present invention.

FIG. 5 illustrates the outcome parallel processing circuit of FIG. 2 making a determination that a data access is a cache mispredict, in accordance with one embodiment of the present invention. As shown in FIG. 5, the virtual address points to two entries 222, 224 of associative cache 202. The desired data is actually stored in entry 224 of Bank 1 (as identified by the hatched pattern). As described above, when associative cache 202 is accessed, data from entries 222, 224 of the associative cache are outputted to data selection circuitry 210. Data selection circuitry 210 selects either data from entry 222 of associative cache 202 or data from entry 224 of the associative cache for output depending on a selection input read from bank select table 208. As shown in FIG. 5, the virtual addresses of entries 222, 224 of associative cache 202 index into entry 216 of bank select table 208. Here, a value of 0, which refers to Bank 0, is stored in entry 216 of bank select table 208. Accordingly, with selection input of 0 read from entry 216 of bank select table 208, data selection circuitry 210 selects data from Bank 0 (i.e., entry 222 of associative cache 202) for output.

At the same time data selection circuitry 210 outputs the data, outcome parallel processing circuit 220 makes a determination on whether the data access is a cache hit, a cache miss, or a cache mispredict. As discussed above, first and second comparators 206, 207 compare the virtual address of the accessed data with the addresses of their corresponding banks to determine whether the data is stored in Bank 0 or Bank 1. Second selection circuitry 212 is configured to determine whether the data access is a cache hit. In this example, with selection input of 0 read from entry 216 of bank select table 208, second selection circuitry 212 selects the comparison result from first comparator 206 for output, which identifies the data access from Bank 0 as not a cache hit. If the data access is not a cache hit, then the data access is either a cache miss or a cache mispredict (as circled below second selection circuitry 212 in FIG. 5).

First selection circuitry 214 is configured to resolve whether the data access is a cache miss or a cache mispredict. Since first and second comparators 206, 207 are in parallel communication with first and second selection circuitries 214, 212, both of the first and second selection circuitries simultaneously receive the comparison results from the first and second comparators. Similar to second selection circuitry 212 and data selection circuitry 210, first selection circuitry 214 selects a comparison result from either first comparator 206 or second comparator 207 for output depending on a selection input read from bank select table 208. However, in this two-bank embodiment, an inverse of the selection input read from bank select table 208 is inputted into first selection circuitry 214. In one embodiment, inverter 502 may be used to invert the value read from bank select table 208. The effect of inverting the selection input is to configure first selection circuitry 214 to select the other comparison result for output. For instance, inverter 502 inverts the selection input of 0 read from entry 216 of bank select table 208 to a value of 1. Accordingly, instead of selecting the comparison result from first comparator 206 for output, first selection circuitry 214 selects the comparison result from second comparator 207 that is associated with Bank 1 for output. In this example, output from first selection circuitry 214 identifies that the requested data is in Bank 1 and not Bank 0. Accordingly, the data access of FIG. 5 is a cache mispredict.

Upon a determination that the data access is a cache mispredict, entry 216 of bank select table 208 is replaced with another entry that defines a selection of the bank that contains the data. Thus, entry 216 of bank select table 208 with a value of 0 is replaced with a value of 1. The replacement of entry 216 improves future cache hit rates by redirecting all future data access at the same address to Bank 1, where the data is actually stored, instead of Bank 0.

C. Cache Miss

Figure 6:
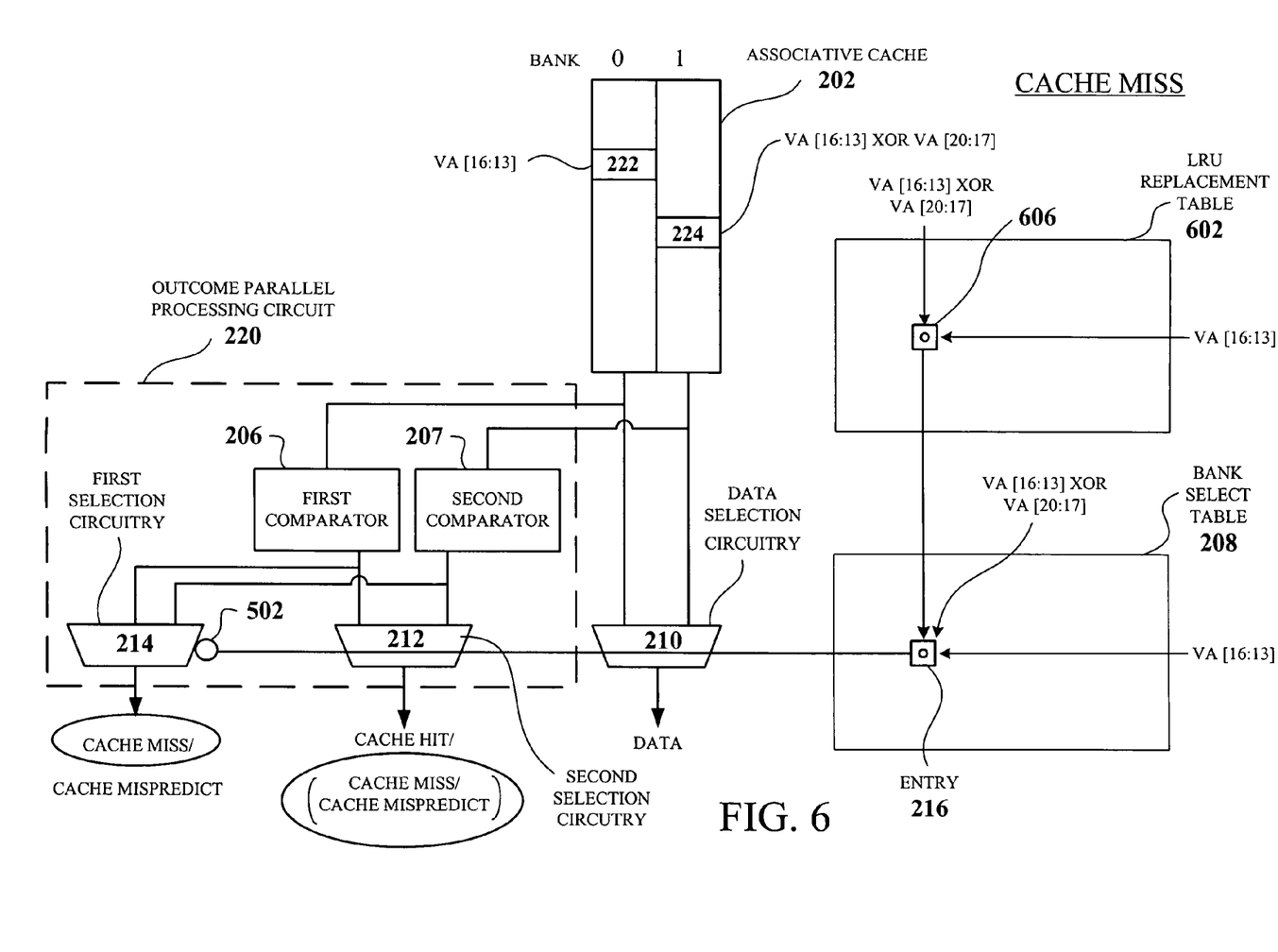
FIG. 6 illustrates the outcome parallel processing circuit of FIG. 2 making a determination that a data access is a cache miss, in accordance with one embodiment of the present invention.

FIG. 6 illustrates the outcome parallel processing circuit of FIG. 2 making a determination that a data access is a cache miss, in accordance with one embodiment of the present invention. As shown in FIG. 6, in one embodiment, circuitry for accessing associative cache 202 can additionally include a second memory that stores least recently used (LRU) replacement table 602, which is in communication with bank select table 208. As will be explained in more detail below, LRU replacement table 602 is configured to include entries that define a bank of associative cache 202 to be replaced when a cache miss occurs.

In this example, virtual address points to two entries 222, 224 of associative cache 202. However, the desired data is not stored in associative cache 202. As described above, when associative cache 202 is accessed, data from entries 222, 224 of the associative cache are outputted to data selection circuitry 210. As shown in FIG. 6, the virtual addresses of entries 222, 224 of associative cache 202 index into entry 216 of bank select table 208, and the entry of the bank select table stores a value of 0, which refers to Bank 0. Accordingly, with selection input of 0 read from entry 216 of bank select table 208, data selection circuitry 210 selects data from Bank 0 (i.e., entry 222 of associative cache 202) for output.

At the same time data selection circuitry 210 outputs the data, outcome parallel processing circuit 220 makes a determination on whether the data access is a cache hit, a cache miss, or a cache mispredict. As discussed above, first and second comparators 206, 207 compare the virtual address of the accessed data with the addresses in the banks to determine whether the data is stored in Bank 0 or Bank 1. In this example, with selection input of 0 read from entry 216 of bank select table 208, second selection circuitry 212 selects comparison result from first comparator 206 for output, which identifies the data access from Bank 0 as not a cache hit. Since the data access is not a cache hit, then the data access is either a cache miss or a cache mispredict (as circled below second selection circuitry 212 in FIG. 6).

First selection circuitry 214 is configured to resolve whether the data access is a cache miss or a cache mispredict. First selection circuitry 214 selects a comparison result from either first comparator 206 or second comparator 207 for output depending on an inverse of a selection input read from bank select table 208. In this example, inverter 502 inverts the selection input of 0 read from entry 216 of bank select table 208 to a value of 1. Accordingly, first selection circuitry 214 selects the comparison result from second comparator 207 that is associated with Bank 1 for output. Since the requested data is not stored in entry 224 of Bank 1, the output from first selection circuitry 214 identifies that the requested data is not in Bank 1 (i.e., not a cache mispredict). Thus, the data access of FIG. 6 is a cache miss (as circled below first selection circuitry 214).

In one embodiment, when a cache miss occurs, entry 216 of bank select table 208 is replaced with a randomly generated entry. In other words, entry 216 of bank select table 208 is replaced with a randomly generated bank selection. Data is then fetched from the main memory and inserted into associative cache 202 at the bank specified by the randomly generated entry (e.g., Bank 0 or Bank 1), ready for a next access.

In another embodiment, as shown in FIG. 6, a cache miss causes entry 606 to be read from LRU replacement table 602. Thereafter, corresponding entry 216 of bank select table 208 is replaced with the value stored in entry 606 from LRU replacement table 602. For instance, as shown in FIG. 6, entry 216 of bank select table 208 is replaced with a value of 0 read from entry 606 of LRU replacement table 602. Like bank select table 208, LRU replacement table 602 includes entries that define a selection of a particular bank, such as Bank 0 or Bank 1. For example, since associative cache 202 has two banks, each entry of LRU replacement table 602 is one bit storing either a 0 value or a 1 value, mapping to Bank 0 or Bank 1, respectively. If associative cache 202 has four banks (not shown), then each entry of LRU replacement table 602 is two bits that may store either a 0 value, a 1 value, a 2 value, or a 3 value, which maps to Bank 0, Bank 1, Bank 2, or Bank 3, respectively. The size of LRU replacement table 602 is the same size as bank select table 208. Thus, the size of LRU replacement table 602 is also based on the size of associative cache 202. The index of LRU replacement table 602 is also the same as bank select table 208. Since the size and index of LRU replacement table 602 are the same as bank select table 208, each entry of the LRU replacement table has a one-to-one correspondence with each entry of the bank select table.

Figure 7:
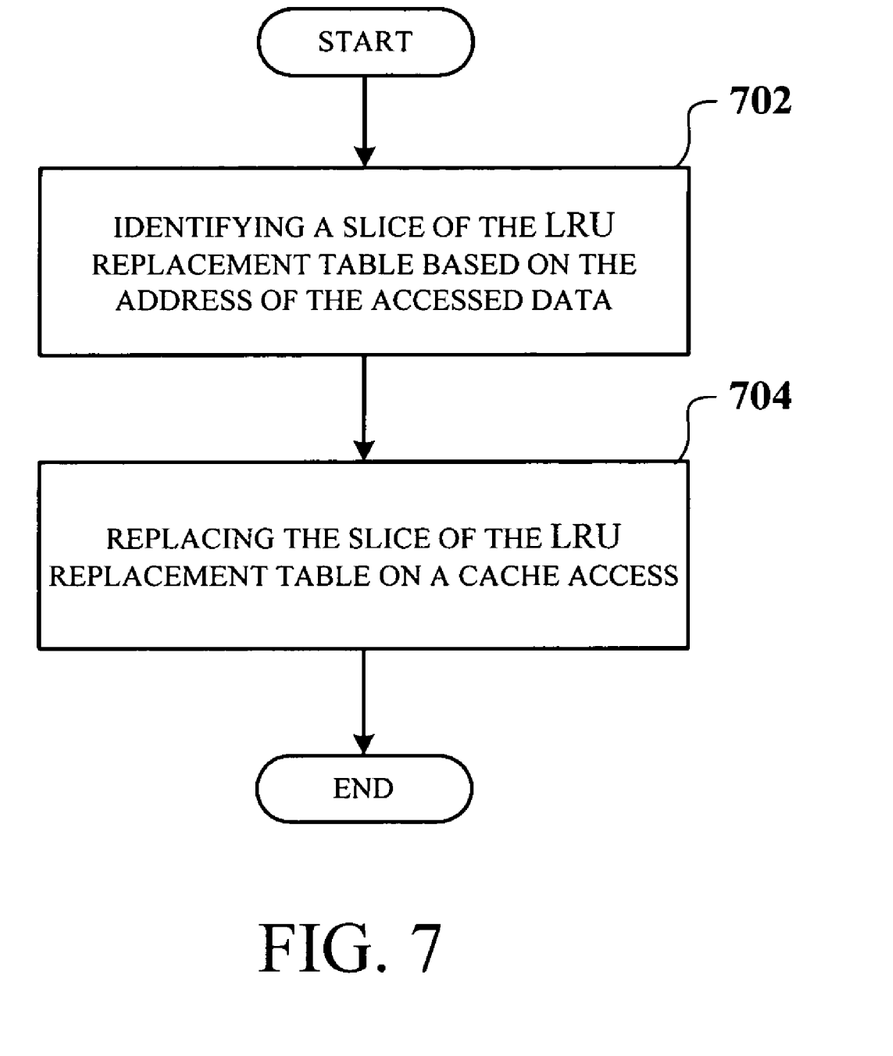
FIG. 7 is a high level flowchart illustrating the method operations for determining the values stored in a least recently used (LRU) replacement table, in accordance with one embodiment of the present invention.

FIG. 7 is a high level flowchart illustrating the method operations for determining the values stored in an LRU replacement table, in accordance with one embodiment of the present invention. Unlike bank select table, LRU replacement table is configured to include entries that define banks of an associative cache to be replaced on a cache miss. It should be appreciated that an entry of the associative cache is replaced with new data from a main memory when a cache miss occurs. To increase future cache hit rates, the most recently used entry of the associative cache is preserved while the less recently used entry is replaced on the cache miss. In one embodiment, every time a cache access occurs, as shown in operation 702, a slice of the LRU replacement table is identified based on the address of the accessed data. A slice is comprised of entries of one or more LRU replacement tables that map to a particular entry of the associative cache. For example, a slice is defined as an entire column or entire row of the LRU replacement table if the associative cache is defined by two banks. In another example, a slice is defined as an entire LRU replacement table if the associative cache is defined by three banks. For associative cache with higher than three banks, a slice can be defined by multiple LRU replacement tables.

As shown in operation 704, after the slice of the LRU replacement table is identified, the slice of the LRU replacement table is replaced with entries that define a selection of a bank of the associative cache that is less recently used. For example, with a two-bank associative cache, if an entry in Bank 0 is less recently used, then a slice of the LRU replacement table that maps to the entry is replaced with Bank 0 identifiers (e.g., a value of 0). On the other hand, if an entry in Bank 1 is less recently used, then a slice of the LRU replacement table that maps to the entry in Bank 1 is replaced with Bank 1 identifiers (e.g., a value of 1).

Figure 8A:
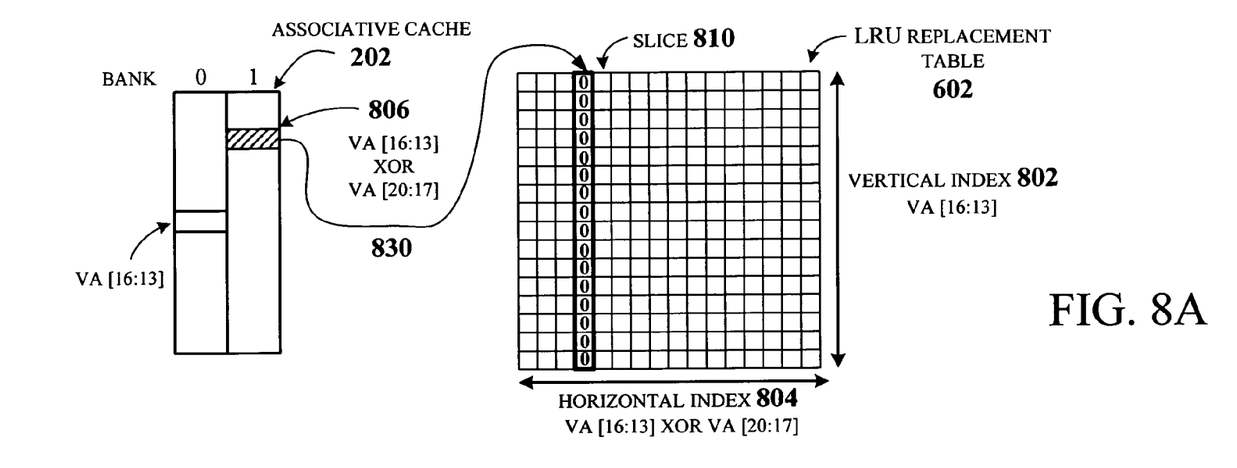
FIGS. 8A and 8B are block diagrams illustrating the replacement of exemplary slices of LRU replacement tables, in accordance with embodiments of the present invention.
Figure 8B:
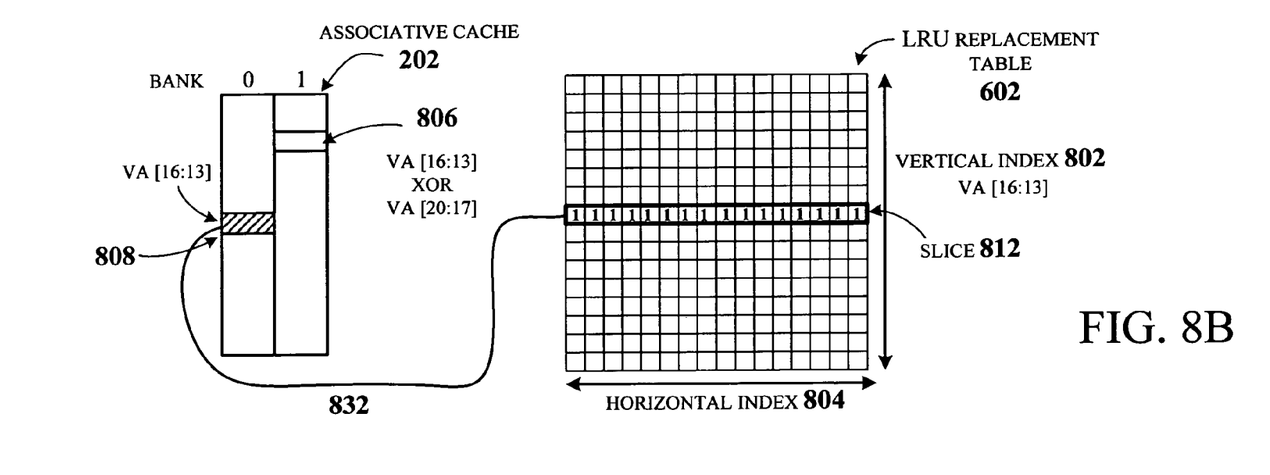

FIGS. 8A and 8B are block diagrams illustrating the replacement of exemplary slices of LRU replacement tables, in accordance with embodiments of the present invention. In these examples, associative cache 202 includes two banks, identified as Bank 0 and Bank 1. With reference to LRU replacement table 602, vertical index 802 indexes Bank 0 by using the lower four bits VA[16:13] of the virtual address. Bank 1 is indexed along horizontal index 804 using a hash of every four bits XORed together (i.e., VA[16:13] XOR VA[20:17]).

Every time a cache access occurs, a slice of LRU replacement table 602 is replaced with entries that define a selection of a bank of associative cache 202 that is less recently used. In the example of FIG. 8A, entry 806 of Bank 1 is the most recently used entry (identified by the hatched pattern). As shown by arrow 830, entry 806 of Bank 1 is indexed to a particular location along horizontal index 804 because, as discussed above, Bank 1 is indexed along the horizontal index. Since LRU replacement table 602 has horizontal index 804 based on the address of Bank 1, slice 810 is defined as an entire column of the LRU replacement table that maps to entry 806 of Bank 1. Since Bank 1 is most recently used, entries of slice 810 are replaced with 0 values that identify Bank 0 as the less recently used. In this example, other entries of LRU replacement table 602 not included in slice 810 are not replaced. The effect of replacing slice 810 of LRU replacement table 602 is to reward entry 806 in Bank 1 such that Bank 0 is preferentially chosen for subsequent replacement. Accordingly, the selection of slice 810 is dependent on the indexing of LRU replacement table 602. For example, if vertical index 802 indexes Bank 1 and horizontal index 804 indexes Bank 0, then a slice is defined by an entire row instead of an entire column.

In another example, FIG. 8B shows entry 808 of Bank 0 is the most recently used entry (as identified by the hatched pattern). As shown by arrow 832, entry 808 of Bank 0 is indexed to a particular location along vertical index 802 because Bank 0 is indexed along the vertical index. Since LRU replacement table 602 has vertical index 802 based on the address of Bank 0, slice 812 is defined as an entire row of the LRU replacement table that maps to entry 808 of Bank 0. Since Bank 0 is most recently used, entries of slice 812 are replaced with 1 values that identify Bank 1 as the less recently used. Here, other entries of LRU replacement table 602 not included in slice 812 are not replaced.

It should be appreciated that the above described method operations and circuitries can be expanded and applied to associative cache with more than two banks. The outcome parallel processing circuit can have any suitable selection circuitries in any suitable combinations configured to identify a cache hit, a cache miss, and/or a cache mispredict for any bank of the associative cache. The bank select table and LRU replacement table may be scaled based on the number of banks. For example, if associative cache has three banks with sixteen entries each, then an embodiment of the invention would have sixteen bank select tables and LRU replacement tables with each of the tables being 16×16 in size. Each entry of the bank select table and LRU replacement table can store either a 0 value, a 1 value, or a 2 value, which identifies Bank 0, Bank 1, or Bank 2, respectively.

In summary, the above-described invention provides methods and circuitries for accessing a multiple-bank associative cache. By making a determination of whether the data access is a cache hit, a cache miss, or a cache mispredict in parallel with data access, embodiments of the invention eliminate the additional time requirement of a conventional associative cache that sequentially compares addresses and then accesses data. Accordingly, the timing of the above-described embodiments is as good as a direct-mapped cache with one bank. Additionally, the performance of the above-described embodiments is better than a conventional two-bank associative cache. The additional implementation of the LRU replacement table can further improve the performance of the above-described invention by 5-10%.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for accessing an associative cache, comprising method operations of:
   a. receiving a request for data in the associative cache, the request including an address of the data;
   b. accessing out the data at the address of the associative cache;
   c. reading an entry from a bank select table based on the address of the data, the entry defining a selection of one of a plurality of banks of the associative cache to output the data; and
   d. determining whether the accessing out the data is one of a cache hit, a cache miss, or a cache mispredict,
   wherein the method operations b, c, and d are processed in parallel.

2. The method of claim 1, further comprising:
   leaving the entry of the bank select table unchanged if the accessing out the data is the cache hit;
   replacing the entry of the bank select table if the accessing out the data is the cache miss;
   replacing the entry of the bank select table with another entry that defines a selection of one of the plurality of banks that contains the data if the accessing out the data is the cache mispredict.

3. The method of claim 2, wherein the replacing the entry of the bank select table for the cache miss comprises:
replacing the entry of the bank select table with a randomly generated entry.

4. The method of claim 2, wherein the replacing the entry of the bank select table for the cache miss comprises:
reading a corresponding entry from a least recently used replacement tables, and
replacing the entry of the bank select table with the corresponding entry from the least recently used replacement table.

5. The method of claim 1, wherein the method operation of reading the entry from the bank select table based on the address of the data includes,
calculating hashes from the address of the data; and
reading the entry from the bank select table using the hashes as an index into the bank select table.

6. The method of claim 1, wherein the method operation of determining whether the accessing out the data includes,
comparing the address of the data with each of the plurality of banks of the associative cache, the comparison defining comparison results; and
determining whether the accessing out the data is one of the cache hit, the cache mispredict, or the cache miss based on the comparison results and the entry from the bank select table.

7. A circuit for accessing an associative cache, comprising:
data selection circuitry in communication with the associative cache;
an outcome parallel processing circuit in communication with the associative cache, the outcome parallel processing circuit being configured to determine in parallel whether an accessing of data from the associative cache is one of a cache hit, a cache miss, or a cache mispredict, wherein the data selection circuitry and the outcome parallel processing circuit operate in parallel; and
a first memory in communication with the data selection circuitry and the outcome parallel processing circuit, the first memory being configured to store a bank select table, the bank select table being configured to include entries that define a selection of one of a plurality of banks of the associative cache from which to output data.

8. The circuit of claim 7, further comprising:
a second memory in communication with the first memory, the second memory being configured to store a least recently used replacement table, the least recently used replacement table being configured to include entries that define one of the plurality of banks of the associative cache to be replaced when the cache miss occurs.

9. The circuit of claim 7, wherein the outcome parallel processing circuit includes,
comparators in communication with the associative cache; and
selection circuitries in communication with the comparators, the selection circuitries having selection inputs being read from the bank select table.

10. The circuit of claim 9, wherein at least one of the selection inputs is inversed.

11. The circuit of claim 9, wherein at least one of the selection circuitries is configured to identify the cache hit.

12. The circuit of claim 9, wherein at least one of the selection circuitries is configured to identify one of the cache miss or the cache mispredict.

13. The circuit of claim 7, wherein the data selection circuitry is a multiplexor.

14. A method for accessing an associative cache, comprising method operations of:
a. receiving a request for data in the associative cache, the request including an address of the data;
b. accessing out the data at the address of the associative cache;
c. reading an entry from a bank select table based on the address of the data, the entry defining a first selection of one of a plurality of banks of the associative cache to output the data;
d. determining whether the accessing out the data is one of a cache hit, a cache miss, or a cache mispredict;
e. providing a least recently used replacement table, the least recently used replacement table being configured to include entries that define one of the plurality of banks of the associative cache to be replaced on a cache miss; and
f. replacing a slice of the least recently used replacement table on a cache access with entries that define a second selection of one of the plurality of banks that is less recently used, wherein the slice is defined as one of an entire column or an entire row of the least recently used replacement table if the associative cache is defined by two banks,
wherein the method operations b, c, and d are processed in parallel.

15. The method of claim 14, further comprising:
calculating hashes based on the address of data being accessed, the hashes defining an index into the least recently used replacement table.

16. The method of claim 14, further comprising:
if the cache access is the cache miss,
reading one of the entries from the least recently used replacement table, and
replacing a corresponding entry of the bank select table with the one of the entries from the least recently used replacement table.

17. The method of claim 16, wherein the method operation of replacing the corresponding entry of the bank select table increases a cache hit rate.

18. The method of claim 14, wherein the method operation of replacing the slice of the least recently used replacement table is configured to fill values in the slice with a constant.

19. The method of claim 14, wherein the method operation of replacing the slice of the least recently used replacement table includes,
providing the associative cache with a first bank and a second bank; and
replacing an entire column of the least recently used replacement table with first bank identifiers if the second bank is most recently used, the least recently used replacement table having a horizontal index based on addresses of the second bank.

20. The method of claim 14, wherein the method operation of replacing the slice of the least recently used replacement table includes,
providing the associative cache with a first bank and a second bank; and
replacing an entire row of the least recently used replacement table with second bank identifiers if the first bank is most recently used, the least recently used replacement table having a vertical index based on addresses of the first bank.

* * * * *